United States Patent
Megiddo (10) Patent No.: US 6,898,665 B1
(45) Date of Patent: May 24, 2005

(54) SYSTEM AND METHOD FOR PROFILING ACCESS TO DISK DRIVE COMMANDS BASED ON A DUAL SERVO MODE MODEL

(75) Inventor: Nimrod Megiddo, Palo Alto, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/481,233

(22) Filed: Jan. 11, 2000

(51) Int. Cl.⁷ .............................................. G06F 12/00
(52) U.S. Cl. ........................................................ 711/113
(58) Field of Search ........................ 711/112–113, 137, 711/151, 154, 167, 172, 100; 710/6; 700/102, 103; 718/102, 103

(56) References Cited

U.S. PATENT DOCUMENTS

| | | | |
|---|---|---|---|
| 4,636,883 A | 1/1987 | Hashimoto | |
| 4,899,234 A | 2/1990 | Genheimer | |
| 5,132,855 A | 7/1992 | Waugh et al. | |
| 5,381,282 A | 1/1995 | Arai et al. | |
| 5,570,332 A | 10/1996 | Heath et al. | |
| 5,664,143 A | 9/1997 | Olbrich | |
| 5,729,718 A | * 3/1998 | Au | 711/167 |
| 5,854,941 A | 12/1998 | Ballard et al. | |
| 5,991,825 A | * 11/1999 | Ng | 710/6 |
| 6,002,540 A | 12/1999 | Cunningham et al. | |

* cited by examiner

Primary Examiner—Matthew D. Anderson
(74) Attorney, Agent, or Firm—Samuel A. Kassatly (57) ABSTRACT

A system and method that utilize a scheduling algorithm to profile the seek operation of an I/O command based on its available rotational time, for improving the average command access time and hence the disk drive throughput. The seek profile of a command is adjusted so that the seek operation is performed in a servo dual mode: a conservative mode at a slower seek velocity, and an aggressive mode at a higher seek velocity. The scheduling algorithm reorders the I/O commands based on the seek length from the current command to the next command, and on the rotational distance that reflects the rotational time. If the rotational time for a particular command is long relative to its seek length, the seek operation is performed in the conservative mode with a very high probability of success within the available time. If, however, the rotational time for a particular command is short relative to its seek length, whereby the conservative mode is expected to require an additional revolution, the seek operation is performed in the aggressive mode with a significant probability of success within the available rotational time. In the event of a resulting miss, a revolution will be added to the rotational time. This dual servo increases the overall probability of success of the seek operation, resulting in a smaller average access time and thereby a higher throughput of the disk drive.

18 Claims, 7 Drawing Sheets

SYSTEM AND METHOD FOR PROFILING ACCESS TO DISK DRIVE COMMANDS BASED ON A DUAL SERVO MODE MODEL

CROSS-REFERENCE TO RELATED APPLICATIONS

This application is related to patent application Ser. No. 09/481,255, titled "System and Method for Scheduling Disk Drive Commands by Expected Total Access Time", that issued on Jun. 3, 2003 as U.S. Pat. No. 6,574,676, and to patent application Ser. No. 09/481,231, titled "System and Method for Grouping Disk Access Commands in a Queue According to Proximate Disk Positions", which are filed by the same assignee as this application on even date herewith, and incorporated herein by reference in their entirety.

FIELD OF THE INVENTION

The present invention relates to the field of data storage, and particularly to a system and method for performing the seek operations in rotating disk drives. More specifically, this invention relates to a computer program product for profiling the seek operation of an I/O command based on its available rotational time, for improving the average command access time and hence the disk drive throughput.

BACKGROUND OF THE INVENTION

Computer systems or other accessories, collectively referred to as "computer systems", generally include data storage devices, such as hard disk drives. A hard disk drive is an electromechanical or an optical-mechanical device that reads from and writes to a hard disk that includes one or more disk platens. The main components of a disk drive are a spindle on which the platens are mounted, a drive motor for spinning the platens, one or more read/write heads, a seek mechanism for positioning the heads over the platens, and a controller which synchronizes read/write commands and transfers information to and from other components of the computer system.

In operation, the computer system provides logical instructions to its disk drive, to read or write data into storage locations on the disk. Although the instructions typically include a logical address for the data, the data is not stored in logical format; rather, the data is stored in a physical address location. The controller typically translates the logical address into a physical address. Once the translation occurs, the controller directs the heads to the physical address location at which the desired data is stored or read.

The amount of time from the start of the movement of the heads arm until the start of the read or write phase of an I/O command is referred to as the "access time". Access time is comprised of two components. The first component is the seek and settling time, which is the time required to move a disk drive's read/write head to a specific track or cylinder on a disk and settling it on the target track. The second component is the rotational latency time, which corresponds to the additional time required for the disk to rotate so that the desired physical address location is located underneath the properly positioned head.

The available rotational time of a command is calculated based on the rotational position of the command and the current position of the head. If there is no chance that the command could be accessed at that time because of the radial distance, this rotational time is repeatedly incremented by one revolution time, until there is a positive probability of a successful access.

Each disk typically includes a plurality of concentric tracks, on one or both surfaces, from which information is read, or onto which information is written by a read/write element. In addition, each track is further divided into a plurality of sectors. A cylinder is formed by a plurality of tracks with the same radial coordinate. In a disk drive, a disk rotates at a high speed while the read/write element "flies" over the surface of the rotating disk. The read/write element is positioned over specific areas or sectors of the disk in accordance with commands received from the computer system. The numerous commands of the computer system usually exceed the drive's ability to execute the commands immediately upon receipt, in which case a queue is formed. The set of commands available for execution by the disk drive is referred to as the "command queue".

Traditionally, controllers have been developed to reorder the command queue according to a positional sequence. Examples include reducing the number of changes in the direction of the movement of the head, ordering according to the shortest calculated head movement regardless of direction, and more commonly ordering according to the shortest overall access time between successive commands.

Numerous methods of drive scheduling have been devised to minimize the average access time. The conventional rule used by scheduling algorithms has been to choose the next read/write command from its local queue by essentially executing the earliest executable command. There is, however, some uncertainty with regard to the actual time it would take from the end of the currently active command, that is the command being currently executed, until the onset of execution of the next command. In part, this uncertainty is due to the fact that the seek and settling times are not absolutely deterministic. In some cases, due to the variance of the seek and settling time, the head will not be ready to start executing even though the correct rotational position has been attained. Another problem is that even if there were no uncertainty, once the start and end positions are taken into account, still there would not be sufficient time to calculate the precise access time while the scheduling algorithm is scanning the queue of commands.

In the event the actual access time is underestimated, a complete revolution may be lost. A common solution has been to add a "safety" margin (sometimes called a "fudge" factor) to the seek and settling time and establish a safe estimate of the time at which execution can start for certain. By adding this safety margin, the scheduling algorithm sometimes bypasses or delays a command if this command is not certain to be executed during the first revolution. Such approach could significantly and adversely affect the throughput of the disk drive.

In alternative disk scheduling algorithm is illustrated in U.S. Pat. No. 5,132,855 to Waugh et al., that describes a method for eliminating overshoot of a destination track by a servo head of a rotating disk during seeks, wherein the seek is carried out in accordance with an adaptive velocity demand profile selected, to undershoot the destination track by an amount sufficient to offset overshoot arising from an incapacity of the servo head to follow a velocity demand profile. Prior to performing the seek, the servo head is moved a distance about a null position on the disk, at which the only force on the actuator on which the head is mounted arises from a constant current passed through the actuator and the time for the movement is measured and utilized to select the adaptive demand profile. Adaptive demand profiles are obtained by performing seeks while modifying a nominal profile to eliminate actuator current ringing at the end of the seek. However, the seek time is governed by the physical ability of the seek mechanism to move the read/write head to the desired location, and the electromechanical response of the seek mechanism must be allowed time to settle both electrically and mechanically, with the total settling time based on the seek velocity and swept range.

Another disk scheduling method is illustrated in U.S. Pat. No. 5,570,332 to Heath et al that describes a method to reduce rotational latency in a disk drive by dividing the disk into discrete angular regions. The command queue is then sorted according to commands addressing cylinders or tracks within the angular region having the shortest rotational latency. The sorting algorithm searches the queue for commands addressing physical addresses beginning with those in neighboring angular regions. With each repositioning of the read/write head, the rotational latency of the angular regions from the new head location is reevaluated. However, the time estimates are based on adding safety margins and hence are biased.

Yet another disk scheduling method is exemplified in U.S. Pat. No. 5,664,143 to Olbrich, that describes a method for the rotational position queue to be initially ordered. A first command is chosen and assigned the physical address of its last requested block. Each remaining command in the queue is assigned the physical address of its first requested block. The address differences between each remaining command and the first command are converted into a time difference. The time required for the head to be positioned, the seek time, is subtracted from each time difference. For subtractions resulting in times less than zero an additional amount of time corresponding to a full revolution of latency is added. The commands are then sorted by the smallest time difference, such that the command with the shortest time difference becoming the next command. After the execution of the first command, the command with the shortest time difference is removed from the queue and the next command becomes the first command. The ordering algorithm is then repeated to determine a new next command. Though this scheduling algorithm may have met its objectives, there is nonetheless room for further optimization of expected access seek time by using probabilistic criteria to evaluate commands in the disk scheduling queue.

Still another disk scheduling method is illustrated in U.S. Pat. No. 5,854,941 to Ballard et al., that describes a disk scheduling queue for sorting pending disk I/O commands according to an estimated access time. The estimated access time is calculated from first and second rotational times that are derived from a rotational time table based on logical address and head movement time. Once the command is executed, the rotational positioning algorithm is repeated and the queue is resorted. However, the estimate results in a deterministic value rather than a weighted average that takes into account the probabilities of the possible values.

It is therefore clear that the ability of the head to be placed at the desired track has heretofore been either assumed to be a deterministic factor, or the rotational latency is assumed to provide a sufficient time for certain success of executing the command at the estimated time. Thus, there is still an unsatisfied need for a scheduling algorithm that selects commands based on an unbiased probabilistic approach, for reducing the disk drive latency and improving its throughput. The scheduling algorithm should also be capable of profiling the seek of an I/O command based on its available rotational time, to further improve the average command access time and hence the drive throughput.

SUMMARY OF THE INVENTION

In accordance with the present invention, a computer program product is provided as a scheduling algorithm for use in disk drives to place I/O commands in a queue. The scheduling strategy is implemented by selecting commands based on a probabilistic approach that minimizes the expected next command access time. Thus, the present scheduling algorithm allows data to be accessed in the shortest expected amount of time possible, maximizes the throughput of the drive and improves the overall performance of the computer system.

The scheduling algorithm of the present invention improves the disk I/O average access time by estimating the expected access time (EAT) for the queued commands, and by selecting commands so that the command with the least EAT (LEAT) is executed first.

Whereas certain conventional scheduling algorithms rely on rotational latency or appended additional time to compensate for the uncertainty inherent in the seek and settling times, as described earlier, the probabilistic approach of the present invention does not postpone the execution of commands due to this uncertainty, but rather relies upon, and incorporates such uncertainty as a useful criterion in the comparison of commands. An exemplary criterion used in a preferred embodiment of the present invention is the least expected access time.

The least expected access time is a concept which is introduced herein, and which is derived by having the disk scheduling algorithm sort pending disk I/O commands into a disk scheduling queue according to the expected time necessary to reach the target positions on the disk. The probabilistic algorithm weights the possible access times of commands sorted in the disk scheduling queue, and accounts for the probability of the drive executing a command during the first possible revolution as well as the probability of the drive executing the command in the second possible revolution. Both of these probabilities are taken into consideration in reaching a final determination as to queue order of the commands. This would eliminate the rigid deterministic approach followed by conventional scheduling algorithms and allow for taking calculated risks in scheduling commands so as to minimize the long-term average latency.

As an illustration, the scheduling algorithm assigns an Expected Access Time EAT(i) to an ith command as follows:

$$EAT(i)=(1-p(i))\ s(i)+p(i)(s(i)+r)\ s(i)+r\ p(i),$$

where p(i) is the probability that a revolution will be missed, r is the one revolution time, and s(i) is the minimum time it would take to achieve the correct rotational position with nonzero probability of completing the seek and settling. The probability p(i) reflects various types of uncertainties, both intrinsic and resulting from the lack of computational resources. For simplicity purposes, the possibility of missing more than one revolution was neglected, though those skilled in the art could account for this factor without departing from the scope of the present invention.

According to one embodiment, the scheduling algorithm will assign an EAT to each of the commands in the queue. As a result, each of the queued commands will be provided with a single number rather than two numbers as explained above in connection with the conventional deterministic approach. The scheduling algorithm will then reorder the queue commands according to a desired LEAT scheme, for example according to ascending expected access times, so that the command with the LEAT will be executed next.

According to an alternative embodiment, the probability p(i) does not have to be computed for every single command in the queue. Rather, depending on the current best candidate, if a command certainly cannot be accessed faster than the current best candidate, then this command will not be assigned an EAT.

In another embodiment, the seek profile of a command is adjusted so that the seek operation is performed in a servo dual mode: a conservative mode at a slower seek velocity, and an aggressive mode at a higher seek velocity. The scheduling algorithm reorders the I/O commands based, not only on the radial distance (i.e., seek length) from the current command to the next command, but also on the rotational distance that reflects the rotational time. If the rotational time for a particular command is long relative to its seek length, the seek operation is performed in the conservative mode with a very high probability of success within the available time.

If, however, the rotational time for a particular command is short relative to its seek length, whereby the conservative mode is expected to require an additional revolution, the seek operation is performed in the aggressive mode with a significant probability of success within the available rotational time. In the event of a certain miss even in the aggressive mode, a revolution is added in advance to the available rotational time. One advantage of this embodiment is that it increases the overall probability of a successful seek operation, resulting in a smaller average access time and thereby a higher throughput of the disk drive.

DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF THE INVENTION

Figure 1:
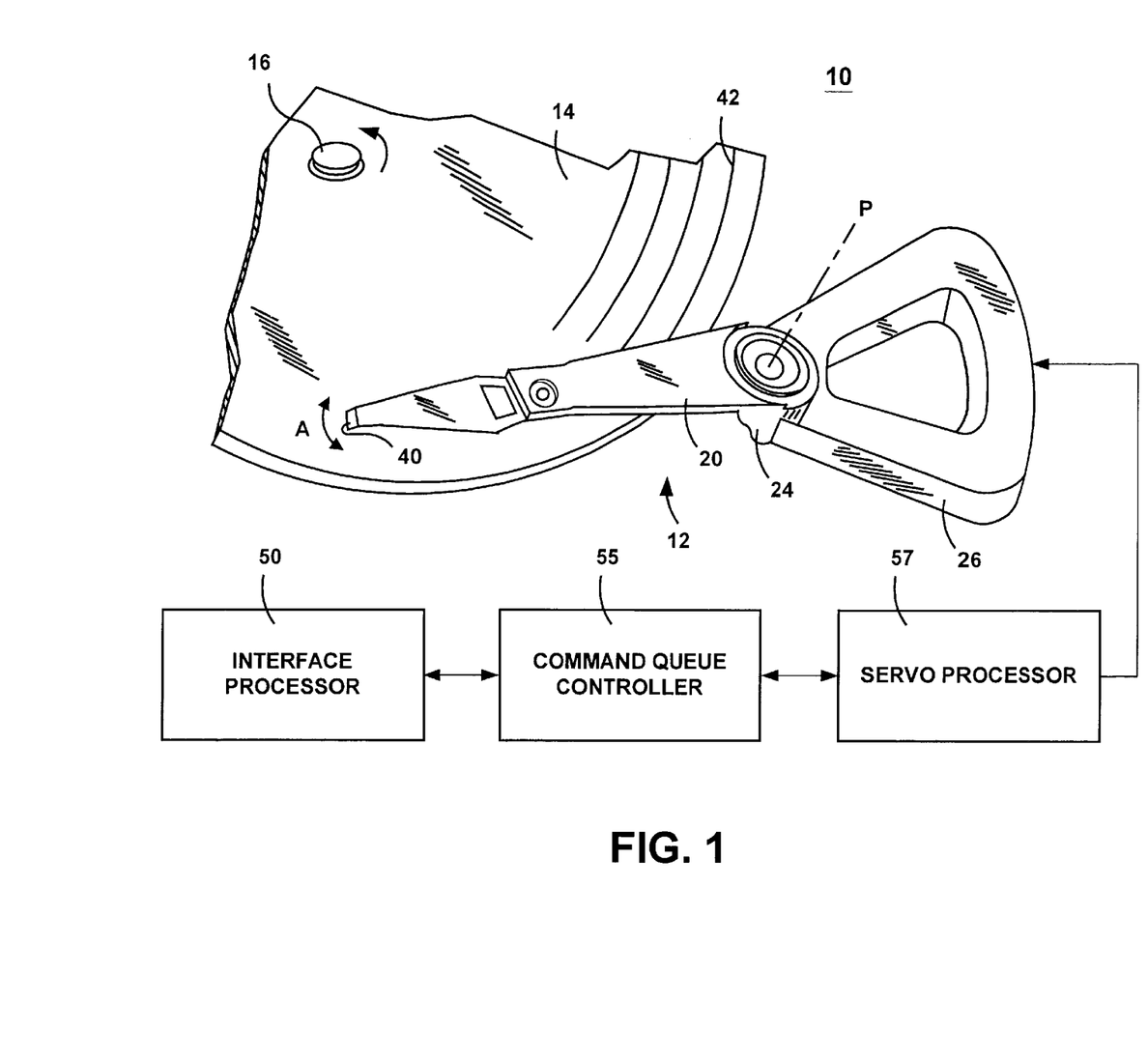
FIG. 1 is a schematic illustration of a disk drive that implements a scheduling algorithm according to the present invention.
Figure 2:
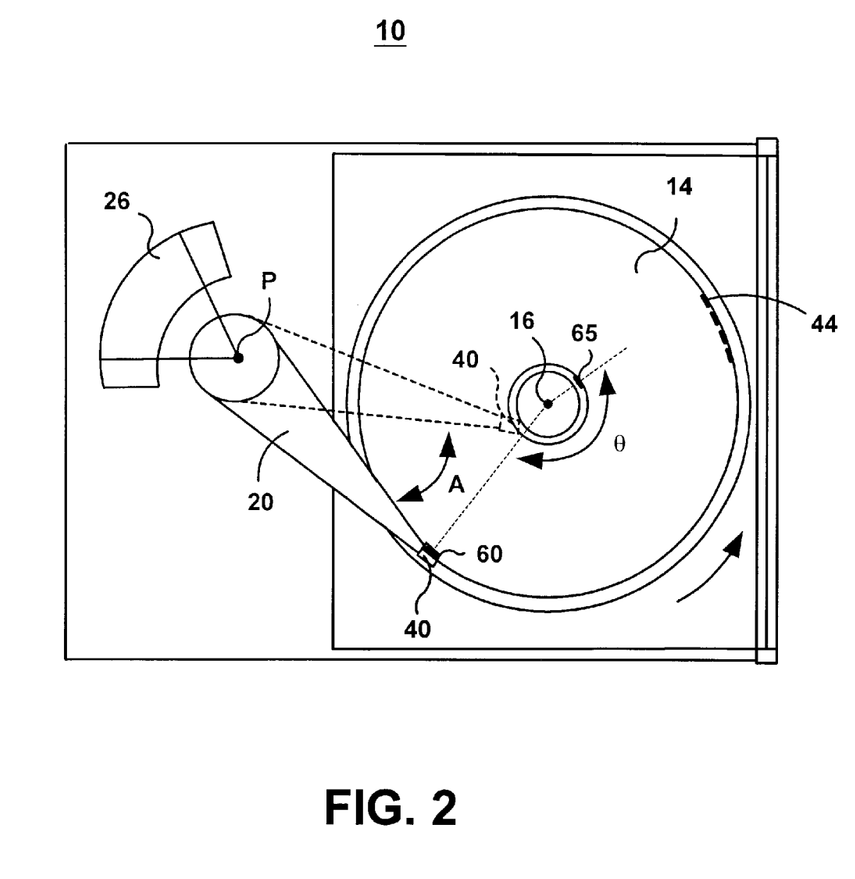
FIG. 2 is a schematic, top plan view of the disk drive of FIG. 1 viewed from a different angle.

FIGS. 1 and 2 illustrate a disk drive 10 comprised of a head stack assembly 12 and a stack of spaced apart magnetic, optical and/or MO data storage disks or media 14 that are rotatable about a common shaft 16. The head stack assembly 12 includes a number of actuator arms 20 that extend into spacings between the disks 14, with only one disk 14 and one actuator arm 20 being illustrated for simplicity of illustration.

The head stack assembly 12 also includes an E-shaped block 24 and a magnetic rotor 26 attached to the block 24 in a position diametrically opposite to the actuator arms 20. The rotor 26 cooperates with a stator (not shown) for the actuator arms 20 to rotate in a substantially radial direction, along an arcuate path in the direction of an arrow A. Energizing a coil of the rotor 26 with a direct current in one polarity or the reverse polarity causes the head stack assembly 12, including the actuator arms 20, to rotate around axis P in a direction substantially radial to the disks 14.

A transducer head 40 is mounted on the free end of each actuator arm 20 for pivotal movement around axis P. The magnetic rotor 26 controls the movement of the head 40 in a radial direction, in order to position the head 40 in registration with data information tracks or data cylinders 42 to be followed, and to access particular data sectors 44 on these tracks 42.

Numerous tracks 42, each at a specific radial location, are arrayed in a concentric pattern in a magnetic medium of each surface of data disks 14. A data cylinder includes a set of corresponding data information tracks 42 for the data surfaces of the stacked disks 14. Data information tracks 42 include a plurality of segments or data sectors 44, each containing a predefined size of individual groups of data records that are saved for later retrieval and updates. The data information tracks 42 can be disposed at predetermined positions relative to a servo reference index.

The location of each sector 44 is identified by a sector identification (SID) read by the head 40 from the disk surface. Each command is stored as an object of a linked list (or a data structure) representing the queue, and is characterized by a physical location on the surface of the disk 14, which occupies one or more data sectors 44. Each data sector is identified by a radial coordinate and an angular coordinate (also referred to as rotational position).

The disk drive 10 further includes an interface processor 50 which is coupled to a command queue controller 55 that links the interface processor 50 to the head stack assembly 12, via a servo processor 57. The interface processor 50 implements a scheduling algorithm that sets a queue execution order of the pending commands when the current I/O command is being executed. During operation, the command queue controller 55 receives the logical addresses of the commands from the interface processor 50, and translates them into physical addresses on the disks 14. The command queue controller 55 then sends control signals to the servo processor 57 to move the heads 40. In FIG. 1, the interface processor 50, the command queue controller 55 and the servo processor 57 are shown to constitute part of the disk drive 10. However, persons skilled in the art will recognize that these components may be provided as part of a separate host computer system.

Figure 3A:
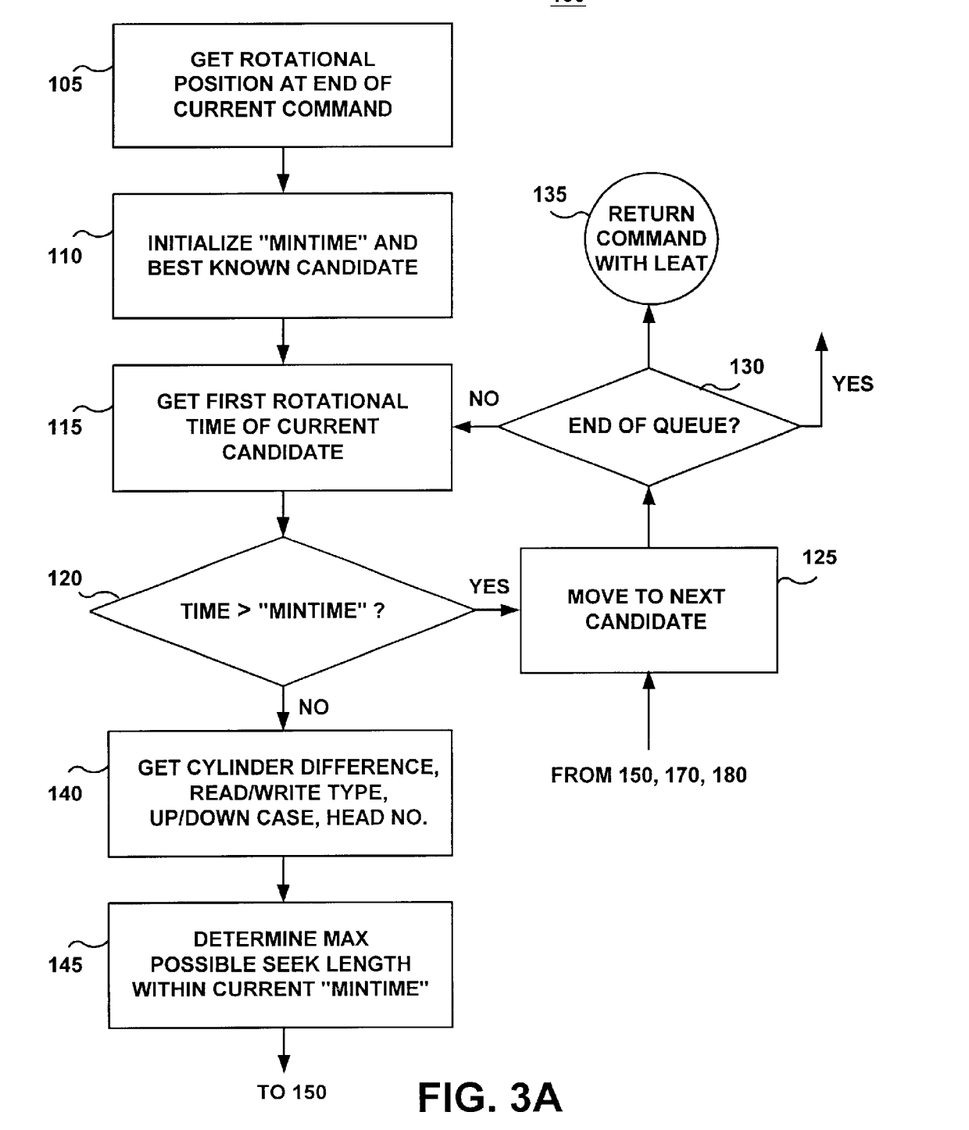
FIG. 3 is comprised of FIGS. 3A and 3B, and represents a flow chart that illustrates the operation of a preferred embodiment of the scheduling algorithm.
Figure 3B:
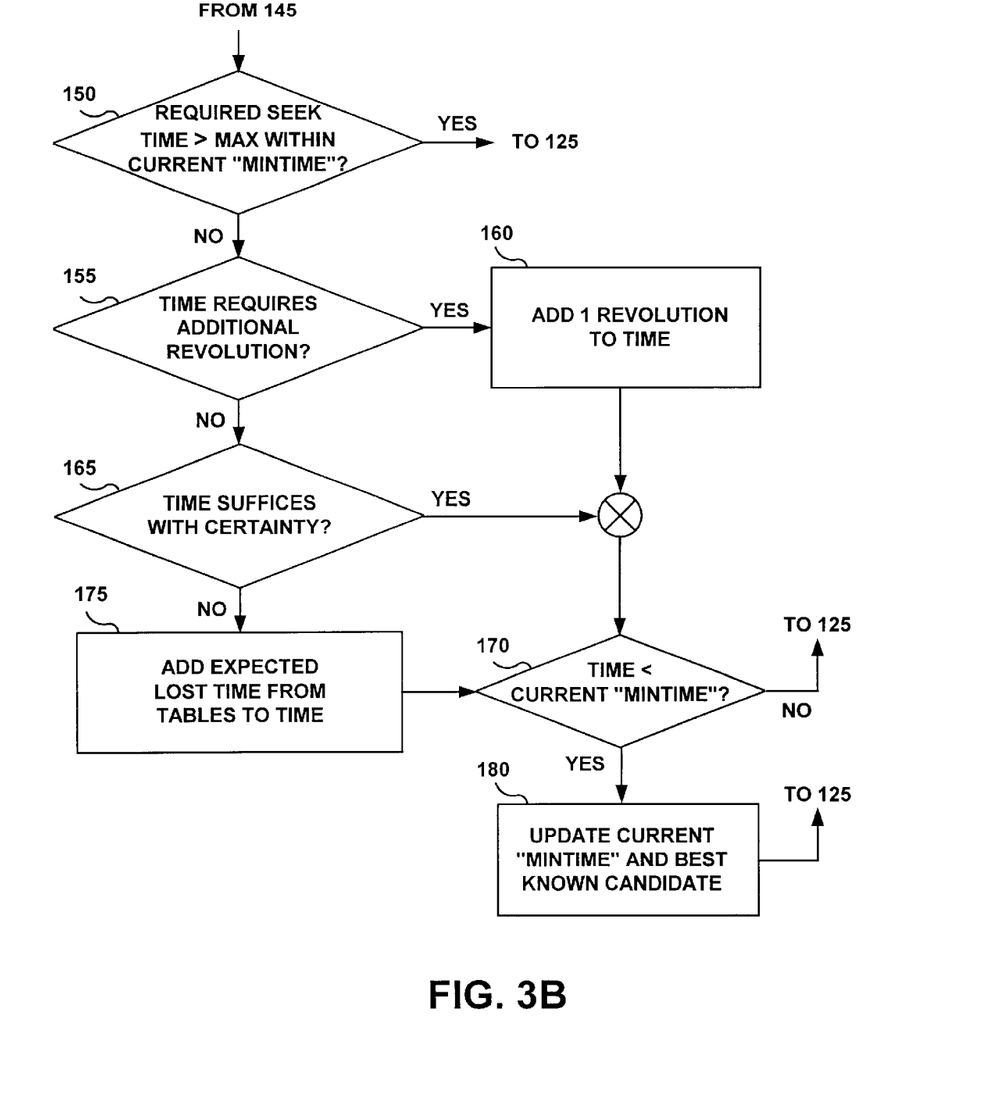

Having described the general environment in which the present invention can be used, its operation will now be described with further reference to FIG. 3 (FIGS. 3A and 3B). The present scheduling algorithm is implemented by the command queue controller 55 for sorting and scheduling commands in a command queue, to substantially minimize the long-term average access time of commands. As it will be explained below, the algorithm identifies a candidate command from the command queue with the least expected access time (LEAT), and reorders the command queue accordingly, so that this candidate command is executed following the current command. Using the LEAT leads to an approximately minimum average access time in the long run.

The scheduling algorithm is represented by a method 100 and illustrated in FIGS. 3A and 3B. The scheduling algorithm starts at block or step 105 by marking the end of the execution of the current command by the head 40. With reference to FIG. 2, an exemplary current command is denoted by the numeral reference 60. At step 110, the scheduling algorithm initializes "mintime", by setting it to a predetermined large value. As used herein, "mintime" denotes a program variable which is gradually decreased until it reaches a final minimum value.

At step 115, the scheduling algorithm acquires the first rotational time of a candidate command in the queue. With reference to FIG. 2, an exemplary candidate command is denoted by the numeral reference 65. The rotational time of the candidate command 65 is measured by the angular difference between the candidate command 65 relative to the end of the current command 60. In other terms, the rotational time of the candidate command 65 is the amount of time until the first time after the end of the current command that the rotational position of to the candidate command will coincide with the rotational position of the head 40.

At decision step 120, the scheduling algorithm inquires whether the rotational time determined in step 115 is greater than a current "mintime", which is the shortest expected time for the drive 10 to access a candidate command among those that the command queue controller 55 has scanned so far. If the scheduling algorithm determines that the rotational time is greater than or equal to the current "mintime", which implies the existence of another command in the queue which is at least as appropriate for execution, then the scheduling algorithm bypasses the candidate command 65 and proceeds to the next command in the queue (step 125).

The scheduling algorithm then inquires, at decision step 130, whether the end of the queue has been reached, that is whether the scheduling algorithm has completed the scanning of all the commands in the queue. If it has, then it proceeds to step 135 where it returns the best found result or command with the least expected access time (LEAT). If, on the other hand, the end of the queue has not been reached, the scheduling algorithm returns to the beginning of the loop and considers the next command in the queue.

Returning to decision step 120, if the scheduling algorithm determines that the rotational time is less than he current "mintime", which implies that the candidate command 65 might be better than any previously scanned command, the scheduling algorithm checks additional conditions that would confirm, with a higher degree of certainty, whether or not the candidate command 65 has the least expected access time (LEAT) among previously scanned commands. To this end, the scheduling algorithm proceeds to step 140 where it acquires various parameters specific to the candidate command 65. These parameters include, for example, the cylinder difference, the read/write type, the direction of the movement of the head (inward or outward) and the head number.

Based on these parameters, the scheduling algorithm determines the maximum possible seek length within the current "mintime" at step 145. It then proceeds to decision step 150 (FIG. 3B) where it compares the required seek time for the candidate command 65 (obtained at step 140) with the maximum possible seek length within the current "mintime" (obtained at step 145). This approach allows the scheduling algorithm to optimize the calculation of seek time in that the scheduling algorithm is no longer required to dedicate time referring to look-up tables stored in the interface processor 50 for each candidate command 65. Rather, the scheduling algorithm checks only once the maximum seek time corresponding to the "mintime", and then compares the required seek time for the candidate command 65 to the maximum possible seek length within the current "mintime".

Figure 4:
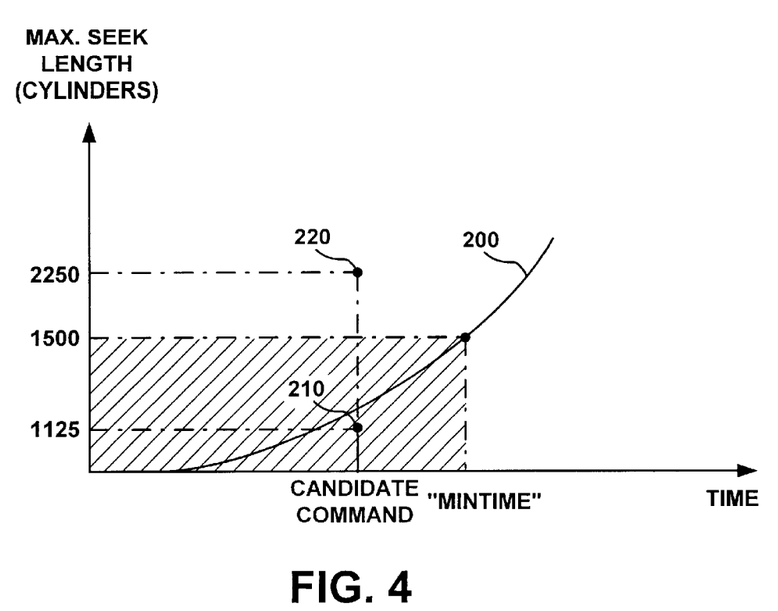
FIG. 4 is a graph that illustrates "mintime" versus maximum seek length for a disk, and which is stored in tabular form in a processor of the disk drive of FIG. 1.

With reference to FIG. 4, it illustrates an exemplary graph 200 that charts the maximum possible seek length versus available rotational time which is stored as a look-up table: in the memory of the interface processor 50. The shaded area, defined by the coordinates of the available rotational time and the coordinate axes, represents the maximum seek length values (measured in cylinders) for candidate commands, that are less than the maximum possible seek length corresponding to the rotational time.

If at step 150 the required seek time for the candidate command 65 is greater than the maximum seek length that is possible within the current "mintime", as exemplified by the value 220 that lies above the shaded area, the scheduling algorithm bypasses the candidate command 65 for not possessing the LEAT, i.e., the currently best known command is more appropriate than the candidate command. The scheduling algorithm then proceeds to step 125 (FIG. 3A) and runs the sequence of steps as described above.

If, however, at step 150 the required seek time for the candidate command 65 is found to be less than or equal to the maximum possible seek length within the current "mintime", as exemplified by the value 210 that lies within the shaded area (FIG. 4), the scheduling algorithm proceeds to perform more refined calculations that would confirm, with an even higher degree of accuracy, whether or not the candidate command 65 has the least expected access time.

To this end, the scheduling algorithm consults a table stored in the memory of the interface processor 50, and inquires at step 155 if, based on the parameters discovered so far, the candidate command may require an additional revolution to be added to the access time corresponding to the required seek length determined at step 140. In one embodiment, the stored look-up table provides two or more (e.g. five) columns of numbers that provide the probability of a successful execution of the candidate command 65. For example, one column provides the shortest seek length with the zero probability of success, and another column provides the length of the longest seek with unity probability of success.

At step 155, the scheduling algorithm compares the seek length of the candidate command 65 to the column with zero probability of success, and, if it determines that the seek of the candidate command is longer than the seek length in that column, then the candidate command time is increased by one revolution at step 160, and the scheduling algorithm proceeds to decision step 170. If at step 155 the scheduling algorithm determines that the seek of the candidate command is shorter than the seek length in the column with the zero probability of success, it does not increase the candidate command time by a revolution, but proceeds to decision step 165.

When appropriate, such as when the seek of the candidate command 65 is not longer than the seek length in the column with the zero probability of success, the scheduling algorithm determines at decision step 165 whether the command time suffices with certainty for the seek. To this end, the scheduling algorithm compares the seek of the candidate command with the seek length in the column time with unity probability of success, and if it determines that the candidate seek is shorter than, or equal to the seek length in that column, then the candidate command 65 is deemed to satisfy the condition of decision step 165, and the scheduling algorithm proceeds to step 170.

If, on the other hand, the scheduling algorithm determines that the required candidate time does not suffice with certainty, that is the candidate seek is longer than the seek time in the column, the scheduling algorithm proceeds to step 175, where it adds the expected lost time from look-up tables stored in the memory of the interface processor 50. This step is carried out as follows: Suppose the rotational time between the end of the current command 60 (FIG. 2) and the start of the candidate command is s. More precisely, it would take s time units for the rotational position of the head to change from that of the end of the current command 60 to that of the start of start of the candidate command.

From the point of view of the scheduling algorithm, the quantity s is a constant depending on the difference in rotational locations. On the other hand, it is sometimes not certain whether the next command could be executed at time s (measured from the completion of the current command) or rather at time s+r, where r is the (constant) time it takes to complete a full revolution. For simplicity purposes, the possibility of missing more than one revolution is neglected in this analysis, though it could be accounted for by persons skilled in the field. If the probability of the candidate command missing a revolution is denoted by p, then the expected access time (EAT) is expressed by the following formula:

$$EAT = s + r\, p.$$

The probability p reflects various uncertainties, both intrinsic and due to the lack of computational resources for a more accurate evaluation. As a result, if a command (i) in the queue has rotational time s(i) and probability of success p(i) during the first revolution, its expected access time (EAT), t(i), is expressed by the following equation:

$$t(i) = s(i) + r\, p(i).$$

The scheduling algorithm then proceeds to decision step 170, where it inquires whether the expected access time for the candidate command 65 obtained in step 140 is less than the current "mintime". If it is not, the scheduling algorithm bypasses the candidate command 65 and proceeds to the next command in the queue at step 125 as explained above. If, on the other hand, the expected access time for the candidate command 65 obtained in step 140 is less than the current "mintime", the scheduling algorithm proceeds to step 180, and updates the current "mintime" with the value of the current candidate command 65. It also stores the identity of the current command as the currently best known command.

Thereafter, the scheduling algorithm returns to steps 125 and 130 (FIG. 3A), as explained above, and terminates by selecting the command with the least expected access time (LEAT) or t(i) at step 135. This choice approximately maximizes the expected throughput of the disk drive 10, and avoids the bias introduced by safety margins. So, for example, if r=100, the scheduling algorithm would prefer a command (i) with a rotational time s(i)=20 and a missed revolution probability of p(i)=0.30 to a command (j) with a rotational time s(j)=55 and a miss probability of p(j)=0, even though the command (i) may miss the revolution with a probability of 30%, since 20+0.3(100)=50<55. As used herein, "throughput" means the average number of commands per unit of time.

The scheduling algorithm includes an efficient implementation of the LEAT criterion, namely, that the probability of a missed revolution p(i) does not have to be computed for every single command in the queue. Depending on the current best candidate, a command can be seen to have no chance of being the best candidate in the queue, regardless of its probability p(i) of a missed revolution.

A method 300 implemented by the scheduling algorithm for profiling the seek of an I/O command based on its available rotational time will now be described in connection with FIGS. 5 and 6. FIG. 6 illustrates three profiles 375, 380, 385 that plot the probability of a successful seek operation (FIG. 5) versus available rotational time.

The first profile 375 illustrates the access operation in an aggressive mode, and is stored in tabular form in the memory of the servo processor 57 of the disk drive 10 of FIG. 1. The second profile 380 illustrates the seek operation in a conservative mode, and is also stored in tabular form in the memory of the servo processor 57. The data in the look-up tables represented by profiles 375, 380 are developed off-line by the disk drive manufacturer for sector 44 on the disk 14. The profiles 375 and 380 intersect at a crossover (or intersection) point 390. As it will be explained later, the third profile 385 is a hybrid graph derived from the first two profiles 375, 380, and is shifted from its original position for clarity of illustration.

Considering now the profiles 375 and 380, they are plotted relative to SID time. As used herein, SID time is the number of SIDs or SID units that separate two sectors 44 or commands 60, 65. SID time bears a direct correlation to the rotational time, or angle between the sectors 44 and two commands (e.g, 60, 65). The maximum SID time corresponds to the longest seek in the drive, i.e., from one boundary to the other, and is usually no more than two revolutions time. One SID time is expressed as follows:

$$1\; SID\; time = (1/N) * 1\; \text{Revolution time},$$

where "N" is a constant selected by the drive manufacturer, and denotes the number of SIDs (or sectors 44) constituting one disk revolution. In one example, "N" is set to 90. In the above formula, "1 Revolution time" is equal to the time it takes the disk 14 to complete one revolution, i.e., 1 minute divided by the disk rotational speed. For example, for a rotational speed of 10,000 RPM, "1 Revolution time" is equal to 1/10,000 minutes, and 1 SID time is equal to 1/90,000 minutes.

Profiles 375 and 380 illustrate the fact that a longer rotational time from a first command to a second command implies a higher probability of a successful movement of the head 40 from the track of the first command to the track of the second command. Similarly, a shorter rotational time from the start sector to the target sector implies a smaller probability of a successful seek 40 from the start track to the target track.

The profile 375 illustrates the aggressive mode of operation whereby the movement of the head is done in the fastest possible way. The profile 380 illustrates the conservative mode of operation whereby the movement of the head is done more slowly and accurately.

The profile 385 is a hybrid graph that combines the characteristics of profiles 375 and 380, in that when a longer rotational time between two sectors or commands is available, the seek will be in the conservative mode of operation, while when a shorter is available rotational time, the seek will be in the aggressive mode of operation. The profile 385 is comprised of two sections: a conservative section 392 that covers data points on the profile 375 below the cross-over point 390, and an aggressive section 395 that covers data points on the profile 380 above the cross-over point 390. The crossover point 390 corresponds to the minimum available rotational time under which a conservative mode will be chosen for a given seek length. Equivalently, a cross-over point can be derived from a given available rotational time, in which case the cross-over point can be expressed as the maximum seek length that should be done in the conservative mode, given the available rotational time. The cross-over points are stored in a table in the memory of the interface processor 50.

Figure 5:
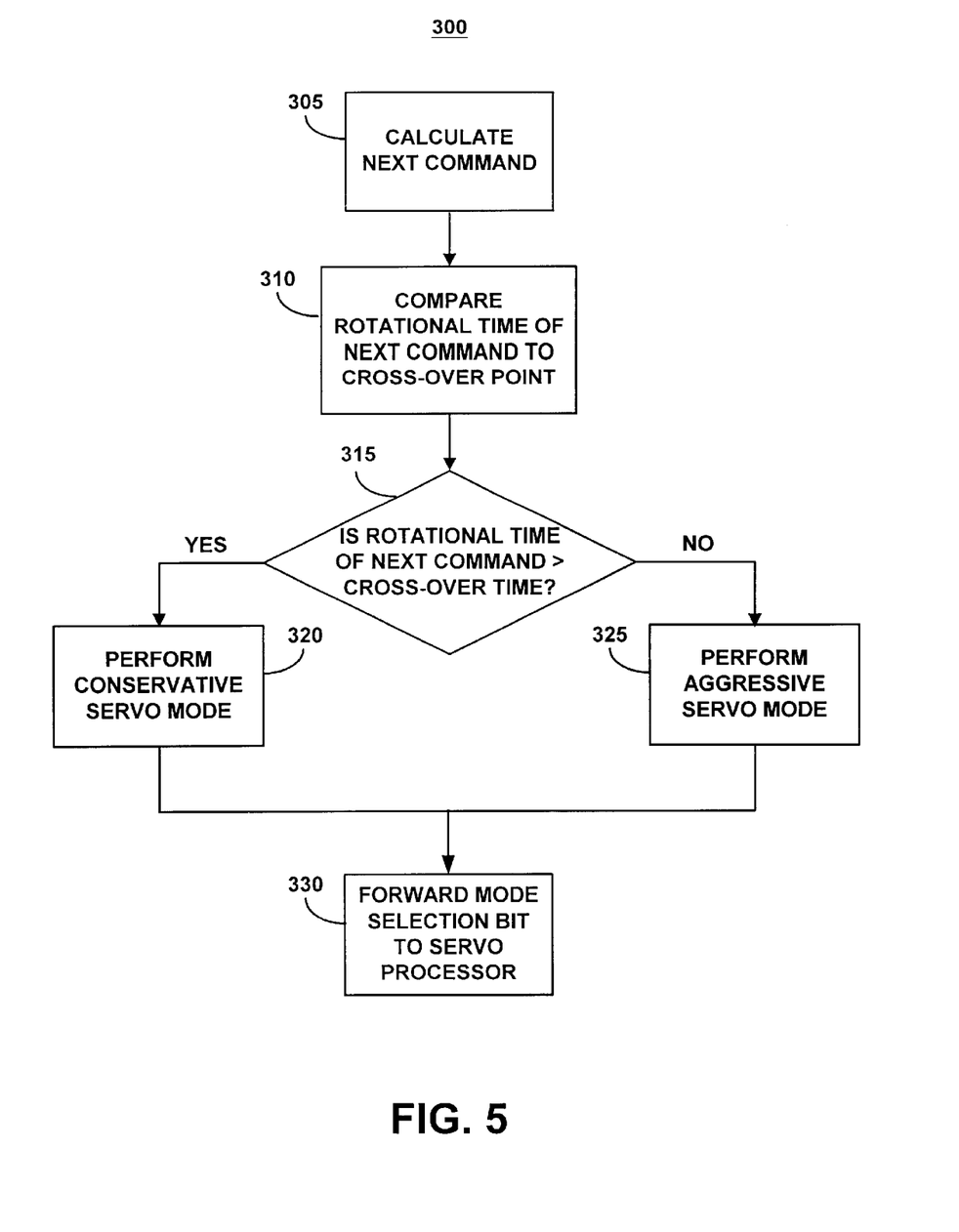
FIG. 5 is a flow chart that illustrates an access operation implemented by the scheduling algorithm of the present invention.
Figure 6:
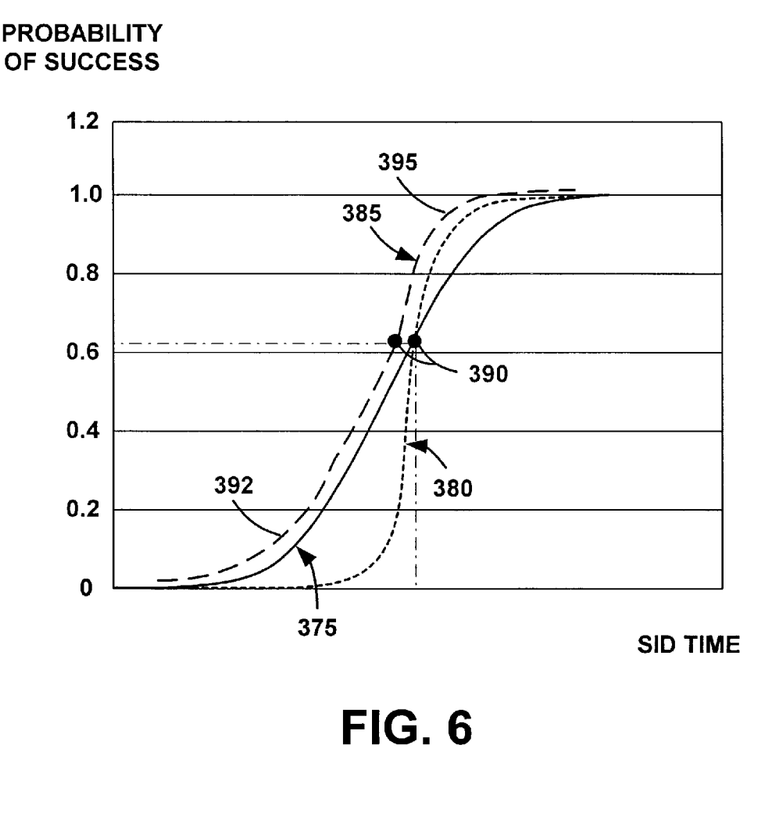
FIG. 6 illustrates three profiles that plot the probability of a successful access operation (FIG. 5) versus available rotational time, two of these profiles illustrate the seek operation in an aggressive mode and a conservative mode and are stored in tabular form in a servo processor of the disk drive of FIG. 1, and the third profile is a hybrid plot which is shifted from its original position for clarity of illustration.

Turning now to FIG. 5, the method 300 for profiling the seek of an I/O command based on its available rotational time is implemented by the scheduling algorithm which runs on the interface processor 50. The implementation of the seek is carried out by the servo processor 57. The method 300 starts after the command to be executed next has been determined at step 305. The process of selecting the next command is explained herein in connection with FIG. 3 (refer to step 135). The method 300 uses the available rotational time of the command to be executed next.

The method 300 then compares, at step 310, the rotational time of the chosen command acquired at step 305 to the cross-over point 390, and inquires if the seek is longer than the crossover value that corresponds to the rotational time of the chosen command. If the method 300 determines that the seek is shorter than the cross-over value, it presumes that the head 40 has sufficient time to arrive to the destination command's track, and selects the conservative (or slower) servo mode of operation to move the head 40 (step 320). Thus, the probability of missing the revolution is minimized.

If, on the other hand, the method 300 determines that the seek is longer than the cross-over value, it presumes that the head 40 does not have sufficient time to arrive at the target track by using the conservative mode, and selects the aggressive (or faster) servo mode of operation to move the head 40 (step 325). Thus, the conditional probability of missing the revolution, given the next command has been determined, is minimized.

After selecting the desired servo mode of operation, the method 300 instructs the servo processor 57 at step 330, of this choice as one bit of information. For example, the scheduling algorithm sets the bit "1" for the aggressive servo mode and the bit "0" for the conservative servo mode. An important advantage of the present invention is that the scheduling algorithm, while expecting to convey the selection instruction (step 330) to the servo processor 57, can now rely on higher estimates of successful access probabilities, and therefore can select commands that otherwise could not be scheduled successfully, thereby improving the average command access and the throughout.

It is to be understood that the specific embodiments of the invention that have been described are merely illustrative of certain application of the principles of the present invention. Numerous modifications may be made to the scheduling algorithm described herein without departing from the scope of the present invention.

What is claimed is:

1. A system for profiling a seek operation of queued commands, comprising:

a scheduling algorithm for assigning an expected access time to at least some of the queued commands; and the scheduling algorithm reordering the queued commands according to a predetermined least expected access time scheme, so that a command with a least expected access time will be executed next; and wherein the expected access time is defined as follows:

$$EAT(i)=(1-D(i))\ s(i)+p(i)(s(i)+r)=s(i)+r\ p(i).$$

where EAT(i) represents the expected access time of an $i^{th}$ queued command, where p(i) represents a probability that a revolution will be missed, where r represents a single revolution time and where s(i) represents a minimum time it would take to achieve a correct rotational position with nonzero probability of completing a seek and setting.

2. The system according to claim 1, further, comprising:

a data structure for storing the commands along with an associated radial position and an associated rotational position for each queued command;

the scheduling algorithm setting a queue execution order of commands while a current command is being executed based on the radial position and the rotational position of a next command relative to the current command;

wherein if the rotational distance to the next command is short relative to the radial distance, the scheduling algorithm performs the seek operation of the next command in an aggressive servo mode represented by a first profile;

wherein if the rotational distance to the next command is long relative to the radial distance, the scheduling algorithm performs the seek operation of the next command in a conservative servo mode represented by a second profile; and wherein the seek operation is represented by a hybrid profile comprised in part by a section of the first profile and in part by a section of the second profile.

3. The system according to claim 2, wherein the first profile and the second profile intersect at a cross-over point; and wherein the section of the first profile includes an aggressive section that covers data points below the crossover point.

4. The system according to claim 3, wherein the section of the second profile includes a conservative section that covers data points above the crossover point.

5. The system according to claim 1, wherein the scheduling algorithm assigns the expected access time to at least some of the queued commands by assigning an expected access time to each of the queued commands.

6. The system according to claim 1, wherein the queued command with the least expected access time is executed following a current command being executed.

7. A computer program product for profiling a seek operation of queued commands, comprising:

a scheduling code for assigning an expected access time to at least some of the queued commands; and the scheduling code reordering the queued commands according to a predetermined least expected access time scheme, so that a command with a least expected access time will be executed next; and wherein the expected access time is defined as follows:

$$EAT(i)=(1-p(i))\ s(i)=p(i)(s(i)+r)=s(i)=r\ p(i)$$

where EAT(i) represents the expected access time of an $i^{th}$ queued command, where p(i) represents a probability that a revolution will be missed, where r represents a single revolution time, and where s(i) represents a minimum time it would take achieve a correct rotational position with nonzero probability of completing a seek and settling.

8. The computer program product according to claim 7, further comprising:

a data structure for storing the commands along with an associated radial position and an associated rotational position for each queued command;

the scheduling code setting a queue execution order of commands while a current command is being executed based on the radial position and the rotational position of a next command relative to the current command;

wherein if the rotational distance to the next command is short relative to the radial distance, the scheduling code performs the seek operation of the next command in an aggressive servo mode represented by a first profile;

wherein if the rotational distance to the next command is long relative to the radial distance, the scheduling code performs the seek operation of the next command in a conservative servo mode represented by a second profile; and wherein the seek operation is represented by a hybrid profile comprised in part by a section of the first profile and in part by a section of the second profile.

9. The computer program product according to claim 8, wherein the first profile and the second profile intersect at a cross-over point; and wherein the section of the first profile includes an aggressive section that covers data points below the cross-over point.

10. The computer program product according to claim 9, wherein the section of the second profile includes a conservative section that covers data points above the cross-over point.

11. The computer program product according to claim 7, wherein the scheduling code assigns the expected access time to at least some of the queued commands by assigning an expected access time to each of the queued commands.

12. The computer program product according to claim 7, wherein the queued command with the least expected access time is executed following a current command being executed.

13. A method for profiling a seek operation of queued commands, comprising:

assigning an expected access time to at least some of the queued commands; and reordering the queued commands according to a predetermined least expected access time scheme, so that a command with a least expected access time will be executed next; and wherein the expected access time is defined as follows:

$$EAT(i)=(1-p(i))\ s(i)+p(i)(s(i)+r)=s(i)+r\ p(i);$$

where EAT(i) represents the expected access time of an $i^{th}$ queued command, where p(i) represents a probability that a revolution will be missed, where r represents a single revolution time, and where s(i) represents a minimum time it would take to achieve a correct rotational position with nonzero probability of completing a seek and settling.

14. The method according to claim 13, wherein assigning the expected access time to at least some of the queued commands comprise assigning an expected access time to each of the queued commands.

15. The method according to claim 13, further comprising executing the queued command with the least expected access time following a current command being executed.

16. The method according to claim 13, further comprising:

storing the commands along with an associated radial position and an associated rotational position for each queued command;

setting a queue execution order of commands while a current command is being executed based on the radial position and the rotational position of a next command relative to the current command;

wherein if the rotational distance to the next command is short relative to an aggressive servo mode represented by a first profile;

wherein if the rotational distance to the next command is long relative to the radial distance then performing the seek operation of the next command in a conservative servo mode represented by a second profile; and representing the seek operation by a hybrid profile comprised in part by a section of the first profile and in part by a section of the second profile.

17. The method according to claim 16, wherein the first profile and the second profile intersect at a cross-over point; and wherein representing the seek operation by a hybrid profile includes forming the hybrid profile of an aggressive section that covers data points below the cross-over point.

18. The method according to claim 17, wherein representing the seek operation by a hybrid profile includes forming the hybrid profile of a conservative section that covers data points above the cross-over point.

* * * * *

UNITED STATES PATENT AND TRADEMARK OFFICE
CERTIFICATE OF CORRECTION

PATENT NO. : 6,898,665 B1
DATED : May 24, 2005
INVENTOR(S) : Nimrod Megiddo

It is certified that error appears in the above-identified patent and that said Letters Patent is hereby corrected as shown below:

Column 12,
Line 7, please replace "setting" with -- settling --;
Line 8, please replace "further," with -- further --;
Line 15, please replace "executed" with -- executed, --;
Line 65, please replace "take achieve" with -- take to achieve --;

Column 13,
Line 7, please replace "executed" with -- executed, --;

Column 14,
Line 24, please replace "executed" with -- executed, --; and
Line 31, please replace "distance then" with -- distance, then --.

Signed and Sealed this

Twenty-fifth Day of October, 2005

JON W. DUDAS
*Director of the United States Patent and Trademark Office*